Patented June 9, 1931

1,809,158

UNITED STATES PATENT OFFICE

JOHANNES BRODE AND CARL WURSTER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ANHYDROUS METAL CHLORIDES AND HYDROGEN CHLORIDE

No Drawing. Application filed March 23, 1927, Serial No. 177,835, and in Germany March 23, 1926.

It is already known that anhydrous chlorides, such as aluminium chloride, can be produced by allowing a mixture of carbon monoxid and chlorine to act upon materials such as aluminium silicates, containing metallic oxids, in a glowing heat. Difficulties however are experienced, according to this process, in heating the material and the reaction gases to the requisite temperatures, and maintaining them at that temperature until the reaction is completed and, moreover, the employment of pure carbon monoxid is essential.

We have now found that gaseous mixtures, such as water gas, containing carbon monoxid and a substantial amount, say 10 per cent by volume, or more, of hydrogen, may be employed with advantage if the same be treated with a sufficient amount of chlorine, preferably in exectly the equivalent quantity for both the carbon monoxid and the hydrogen, and the resulting mixture, in which a reaction, accompanied by a substantial rise in temperature, occurs immediately after ignition be brought into contact with the substances containing metallic oxids. At the resulting temperature, the carbon monoxid and chlorine, or the already formed phosgene, react very rapidly with the metallic oxid, anhydrous chloride and carbon dioxid being formed.

No difficulty is experienced in carrying out this very highly exothermic process in a perfectly continuous manner. Owing to the great amount of heat disengaged, there is no need to provide any special insulating means for the reaction chamber. As a rule, however, it is advisable to employ furnaces which are lined with refractory materials which resist the action of chlorine and are of low heat conductivity, so that the outer shell remains at a moderate temperature and may be constructed of metal, such as iron.

In continuous working, for example in a shaft furnace or rotary tube furnace, the material, such as kaolin, containing metallic oxid, is preferably brought into contact with the gaseous mixture on the counterflow principle, the residue, such as silica, being removed either continuously or at certain intervals, by suitable means, near the gas intake. In the event of a non-volatile metallic chloride, such as chromium chloride, when chrome iron ore is used, being formed during the reaction, the same is removed with the residues. In the production of volatile chlorides, such as aluminium chloride, by the treatment of aluminous materials, or of ferric chloride by the treatment of chrome iron ores, the gas issuing from the furnace consists of the vapor of the metallic chloride, hydrogen chloride and carbon dioxid. In most cases, the metallic chloride is more or less completely deposited in solid or liquid form when the gases are cooled. Should the gas still contain portions of the chloride, in the state of mist, this may easily be precipitated by electrical means, for example in a leaden apparatus, the shell of which constitutes the one electrode, a metal wire, or wire network, forming the counter-electrode. The whole of the metallic chloride may also be deposited by electrical means.

Before being put to any further use, such as the preparation of hydrochloric acid, the hydrogen chloride is preferably separated completely from the metallic chlorides, the last traces of which, if necessary, may be eliminated by washing with concentrated hydrochloric acid. By this means, pure hydrogen chloride can be easily obtained, in addition to the metallic chloride.

The following example will further illustrate the nature of the said invention but the invention is not limited to the example:

Example 750 kilogrammes of kaolin, in the condition of lumps, are dehydrated at a temperature of about 700° C. in an iron furnace, lined with refractory and chlorine-proof silicate bricks. 950 cubic metres of a gaseous mixture composed of 26 per cent of hydrogen, 21 per cent of carbon monoxid, 47 per cent of chlorine, 3 per cent of carbon dioxid and 3 per cent of nitrogen are then passed over the material during a period of 48 hours. The reaction commences immediately, with the formation of aluminium chloride, hydrogen chloride and carbon dioxid, and proceeds smoothly without aid of any external heating. The reaction gases are passed through a series of water-cooled condensers and deposit 560 kilogrammes of anhydrous aluminium chloride. If the gases, which still contain aluminium chloride vapor, are then passed through an electrically operated deposition cell, a further 30 kilogrammes of aluminium chloride will be thrown down. The residual gases are first passed through an aqueous solution of concentrated hydrochloric acid, and then through absorption vessels charged with water, by which means 2400 kilogrammes of hydrochloric acid, of approximately 35 per cent strength, and free from aluminium, are recovered.

The production of the aluminium chloride may be rendered continuous by removing, in a regular manner, the silica formed from the kaolin, and introducing corresponding fresh quantities of dehydrated kaolin. It is preferable that the siliceous residues should be removed while they still contain about 2 to 3 per cent of $Al_2O_3$, because, in this condition, they retain their lumpy character and pass freely through the furnace.

The chlorination of chrome iron ore can be effected in a similar manner, in which case ferric chloride is the principal volatile chloride formed, whilst the chromium chloride also produced is withdrawn with the residue.

We claim:

1. The process of producing anhydrous metal chlorides and hydrogen chloride, which comprises acting on material comprising metal oxide with a gas mixture containing carbon monoxide, at least 10 per cent by volume of hydrogen, and chlorine at a high temperature.

2. The process of producing anhydrous aluminium chloride and hydrogen chloride, which comprises acting on material comprising aluminium oxide with a gas mixture containing carbon monoxide, at least 10 per cent by volume of hydrogen, and chlorine at a high temperature.

In testimony whereof we have hereunto set our hands.

JOHANNES BRODE.
CARL WURSTER.